United States Patent
Soomro et al.

(10) Patent No.: US 7,120,138 B2
(45) Date of Patent: Oct. 10, 2006

(54) DYNAMIC FREQUENCY SELECTION WITH RECOVERY FOR A BASIC SERVICE SET NETWORK

(75) Inventors: Amjad Soomro, Hopewell Junction, NY (US); Sunghyun Choi, Montvale, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 980 days.

(21) Appl. No.: 10/093,300

(22) Filed: Mar. 7, 2002

(65) Prior Publication Data

US 2003/0002456 A1    Jan. 2, 2003

Related U.S. Application Data

(60) Provisional application No. 60/314,134, filed on Aug. 22, 2001, provisional application No. 60/302,628, filed on Jul. 2, 2001.

(51) Int. Cl.
*H04J 1/00* (2006.01)
*H04Q 7/00* (2006.01)
*H04H 1/04* (2006.01)

(52) U.S. Cl. ............... 370/343; 370/329; 370/487
(58) Field of Classification Search ........... 370/328, 370/312, 341–345, 349, 431, 480; 455/161, 455/63
See application file for complete search history.

(56) References Cited

U.S. PATENT DOCUMENTS

| | | | |
|---|---|---|---|
| 5,726,984 A * | 3/1998 | Kubler et al. | 370/349 |
| 6,675,012 B1 * | 1/2004 | Gray | 455/423 |
| 6,941,143 B1 * | 9/2005 | Mathur | 455/452.1 |
| 2002/0060995 A1 * | 5/2002 | Cervello et al. | 370/332 |
| 2002/0188723 A1 * | 12/2002 | Choi et al. | 709/225 |
| 2003/0012166 A1 * | 1/2003 | Benveniste | 370/338 |
| 2003/0171116 A1 * | 9/2003 | Soomro | 455/434 |
| 2004/0037247 A1 * | 2/2004 | Ngo | 370/332 |
| 2004/0141522 A1 * | 7/2004 | Texerman et al. | 370/466 |

OTHER PUBLICATIONS

"Transmitter Power Control (TPC) and Dynamic Frequency Selection (DFS) Joint Proposal for 802.11h WLAN", Mar. 12, 2002, pp. 1-16. XP002213584.

* cited by examiner

*Primary Examiner*—Ricky Q. Ngo
*Assistant Examiner*—Warner Wong
(74) *Attorney, Agent, or Firm*—Larry Liberchuk

(57) ABSTRACT

Dynamic frequency selection for an IEEE 802.11 basic service set network is enabled by a dynamic frequency selection (DFS) element within beacon and probe response frames defining a DFS owner, a DFS interval specifying the time until channel switch in beacon intervals, a DFS count specifying a time in beacon intervals until the DFS owner initiates selection of the next channel frequency from the supported channel set, and a DFS recovery interval specifying a time after the end of the DFS interval when recovery procedures are initiated if no channel switch information was received during that DFS interval. Channel switch information is presented in beacons following the end of the channel selection process, and within beacons during the DFS recovery interval.

34 Claims, 8 Drawing Sheets

DYNAMIC FREQUENCY SELECTION WITH RECOVERY FOR A BASIC SERVICE SET NETWORK

CROSS-REFERENCE TO RELATED APPLICATIONS

This application claims priority to U.S. Provisional Patent Application Ser. No. 60/302,628 filed Jul. 2, 2001 and U.S. Provisional Patent Application Ser. No. 60/314,134 filed Aug. 22, 2001, both of which are incorporated herein by reference.

TECHNICAL FIELD OF THE INVENTION

The present invention is directed, in general, to wireless local area networks and, more specifically, to using dynamic frequency selection within wireless local area networks.

BACKGROUND OF THE INVENTION

Wireless local area networks (WLANs) are currently most commonly implemented according to the Institute of Electrical and Electronic Engineers (IEEE) 802.11-1999 standard, often referred to as "wireless fidelity" or "WiFi". Contemporary implementations generally conform to the IEEE 802.11b standard, which defines wireless local area networks for the 2.4 Gigahertz (GHz) band. However, the 5 Gigahertz band(s) (5.15–5.25 GHz, 5.25–5.35 GHz, and 5.725–5.825 GHz in the United States; 5.15–5.35 GHz and 5.470–5.725 GHz in Europe; and 5.15–5.25 GHz in Japan) offers better prospects for higher data rates and fewer interfering communications.

Two competing standards have emerged for wireless local area networks in the 5 gigahertz band(s): implementations of the IEEE 802.11a standard are currently being developed for use within the United States, while the European Telecommunications Standards Institute (ETSI) has promulgated the High Performance European Radio Local Area Network version 2 (HiperLAN2) standard. Both standards are based on orthogonal frequency division multiplexing (OFDM) for the physical (PHY) layer, and both allow data rates of up to 54 megabits per second (Mbps).

While IEEE 802.11a employs a form of carrier sense multiple access with collision avoidance (CSMA/CA) similar to the Ethernet, HiperLAN2 defines an asynchronous transfer mode (ATM) type architecture better suited for voice and multimedia applications and implements a more sophisticated media access control (MAC) layer. Moreover, in addition to provisions for isochronous communications providing an inherent quality of service (QoS), HiperLAN2 implements dynamic frequency selection (DFS) to reduce interference and allow for better spectrum utilization, as well as transmit power control (TPC) to adjust the power output level. These features are intended to enable seamless communications between third generation (3G) cellular networks and private networks.

Dual mode integrated circuit devices capable of supporting both IEEE 802.11a and HiperLAN2 are currently being developed, with efforts being made to incorporate advantageous HiperLAN2 features into IEEE 802.11a implementations. In particular, the working group IEEE 802.11 Task Group H (TGh) has been formed to develop a standard (IEEE 802.11h) for optional incorporation of dynamic frequency selection and transmit power control into IEEE 802.11a implementations. Furthermore, interference with other primary licensed operators within a band must be detected and avoided in some regulatory domains.

There is, therefore, a need in the art for incorporating dynamic frequency selection into basic service set (BSS) and independent basic service set (IBSS) architectures for wireless local area networks.

SUMMARY OF THE INVENTION

To address the above-discussed deficiencies of the prior art, it is a primary object of the present invention to provide, for use in an independent basic service set (IBSS) network, a dynamic frequency selection (DFS) process enabled by a DFS element within beacon and probe response frames defining a DFS owner, a DFS interval specifying the time until channel switch in beacon intervals, a DFS count specifying a time in beacon intervals until the dynamic frequency selection owner initiates selection of the next operating channel frequency from the supported channel set, and a DFS recovery interval specifying a time after the end of the DFS interval when recovery procedures are initiated if no channel switch information was received during the past DFS interval. Channel switch information is presented in beacons following the end of the channel selection process, and within beacons during the DFS recovery interval.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
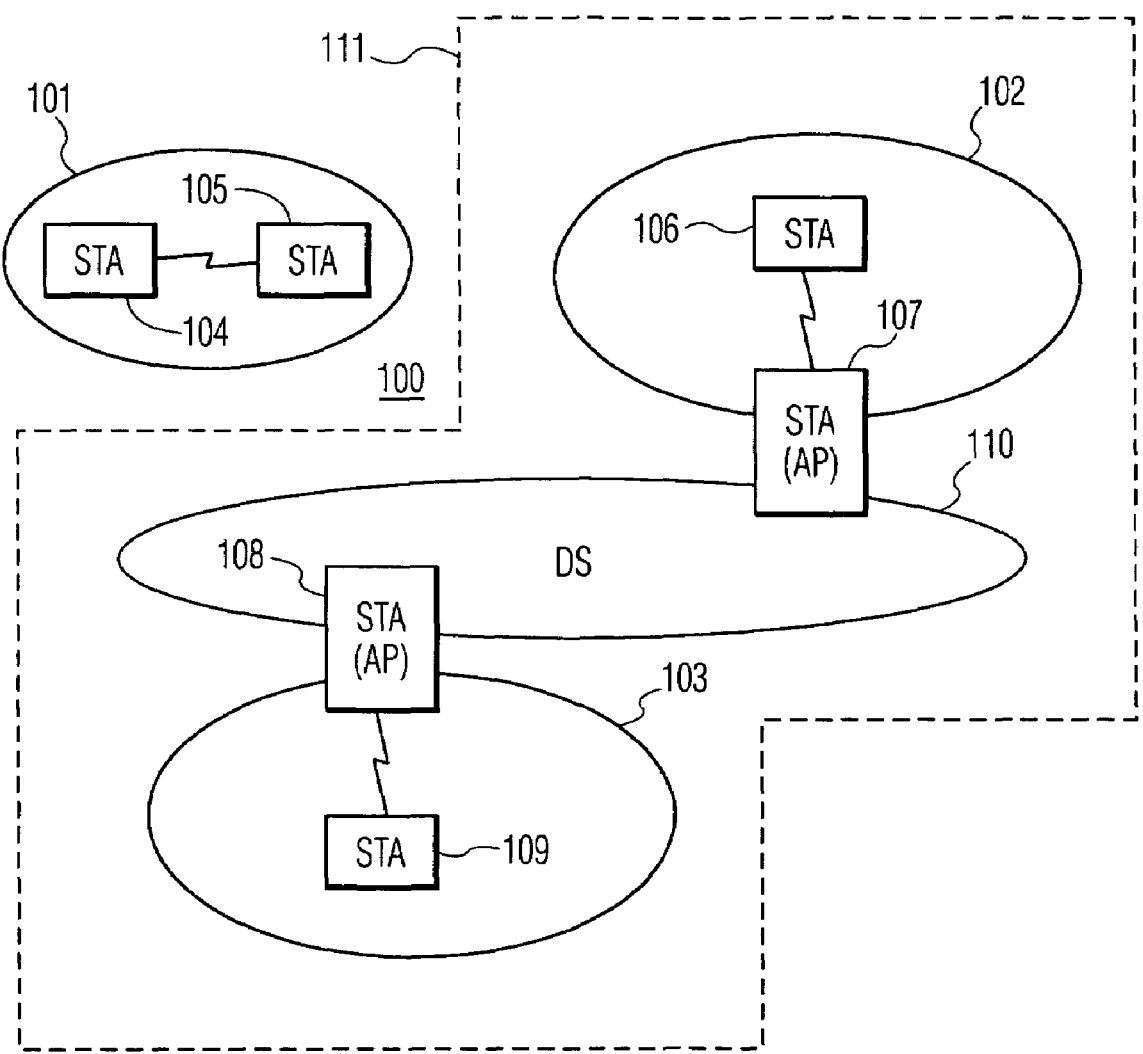
FIG. 1 depicts wireless communications systems in BSS and IBSS modes employing dynamic frequency selection according to one embodiment of the present invention.

FIG. 1 depicts a wireless communications system employing dynamic frequency selection according to one embodiment of the present invention. Wireless communications system 100 is implemented in accordance with the 1999 edition of the IEEE 802.11 standard, with the additional functionality and/or modifications described in further detail below. Accordingly, wireless communications system 100 in the exemplary embodiment includes a plurality of wireless networks 101, 102 and 103, each comprising a basic service set (BSS) network including a number of stations (STA) 104–105, 106–107 and 108–109, respectively, in wireless communication with each other. Wireless network 101 includes only stations 104–105 in wireless communication with each other and each providing only station services (SS) such as (open system or shared key) authentication, de-authentication, privacy (optional) utilizing the wired equivalent privacy (WEP) algorithm and data delivery. Wireless network 101 thus forms an independent basic service set (IBSS) network. The present invention is primarily targeted at wireless networks operating in IBSS mode, but is also applicable to wireless networks operating in BSS mode.

Wireless networks 102 and 103, on the other hand, each include at least one station 107 and 108, respectively, serving as an access point (AP) to a distribution system (DS) 110 linking the two wireless networks 102 and 103. Distribution system 110 may be any suitable means by which access points communicate with one another to exchange frames for stations within their respective basic service set networks, forward frames to follow mobile stations moving from one basic service set network to another, and optionally exchange frames with an external/wired network (Integration Service). Distribution system 110 may thus be, for example, a wired local area network (LAN) such as an IEEE 802.X network, where X denotes a non-IEEE 802.11 standard version applicable to wired networks, or an IEEE 803.2 network.

While stations 106 and 109 in wireless networks 102 and 103 provide only station service like stations 104–105 in wireless network 101, stations 107 and 108 in wireless networks 102 and 103 provide both station service and, in conjunction with distribution system 110, distribution system services (DSS) such as association, disassociation, re-association, distribution and integration. Wireless networks 102 and 103 therefore form infrastructure basic service set networks and, together with distribution system 110, an extended service set (ESS) network 111.

In accordance with IEEE 802.11, wireless communications within wireless networks 101–103 employ a media access control (MAC) layer and a physical (PHY) layer to provide asynchronous, best-effort, connectionless data delivery utilizing carrier sense multiple access with collision avoidance (CSMA/CA).

The current IEEE 802.11 standard includes a mechanism to scan channels before starting a BSS or IBSS network. The operating channel remains the same throughout the lifetime of the network and can only be changed by stopping the network and then starting a new network, a time consuming process which is also disruptive to network traffic. In order to obtain approval of new spectrum allocations (such as the 5 GHz band) by regulatory bodies within European as well as in the United States and other geographic regions, a means to detect or infer the presence of other licensed operators within the current operating channel is required, together with the ability to selectively move to a new channel to avoid interference if such other licensed users are present. Moreover, movement to a new operating channel may be desirable for other reasons as well, such as, for instance, obtaining better channel conditions like signal-to-noise ratio.

Therefore it is desirable to incorporate a mechanism into the current IEEE 802.11 standard allowing an operating wireless network to move to a new frequency channel while continuing the current network operation. Accordingly, the wireless system 100 of the present invention employs dynamic frequency selection as described in further detail below.

Those skilled in the art will recognize that the full structure and operation of a wireless system is not depicted or described in complete detail. Only so much of the known structure and operation of wireless networks as is unique to the present invention or necessary for an understanding of the present invention is depicted and described herein.

At least one station within each of wireless networks 101–103 (typically the initiating station within an independent basic service set network and the access point(s) within each infrastructure basic service set network forming part of an extended service set network) transmits a Class 1 management frame of subtype beacon at periodic intervals to "advertise" wireless networking capabilities.

Additionally, wireless stations seeking to initiate wireless network communications with wireless networks 101–103 transmit probe request frames, to which at least one station within the receiving wireless network 101–103 responds with a management frame of the probe response subtype. Those skilled in the art will recognize that the content of IEEE 802.11 beacon and probe response frames is substantially similar. As with all IEE 802.11 management frames, each beacon and probe response frame begins with a media access control (MAC) header including frame control, frame duration, destination address (DA), source address (SA), basic service set identification (BSSID), and sequence control information and ends with a frame check sequence (FCS).

The bodies of beacon and probe response frames contain similar elements including a timestamp, a beacon interval, capability information, service set identification (SSID), an identification of supported rates, a frequency-hopping (FH) parameter set in frames from stations utilizing frequency-hopping physical (PHY) layer, a direct sequence (DS) parameters in frames from stations utilizing direct sequence physical (PHY) layer, a contention free (CF) parameter set in frames from access points supporting point coordination function (PCF), and an independent basic service set parameter set in frames from stations within an IBSS network. In the present invention, the beacon and probe response frame bodies also include a DFS parameter set as described in further detail below, either in addition to or in lieu of other parameter sets, in frames from stations (STAs).

Figure 2:
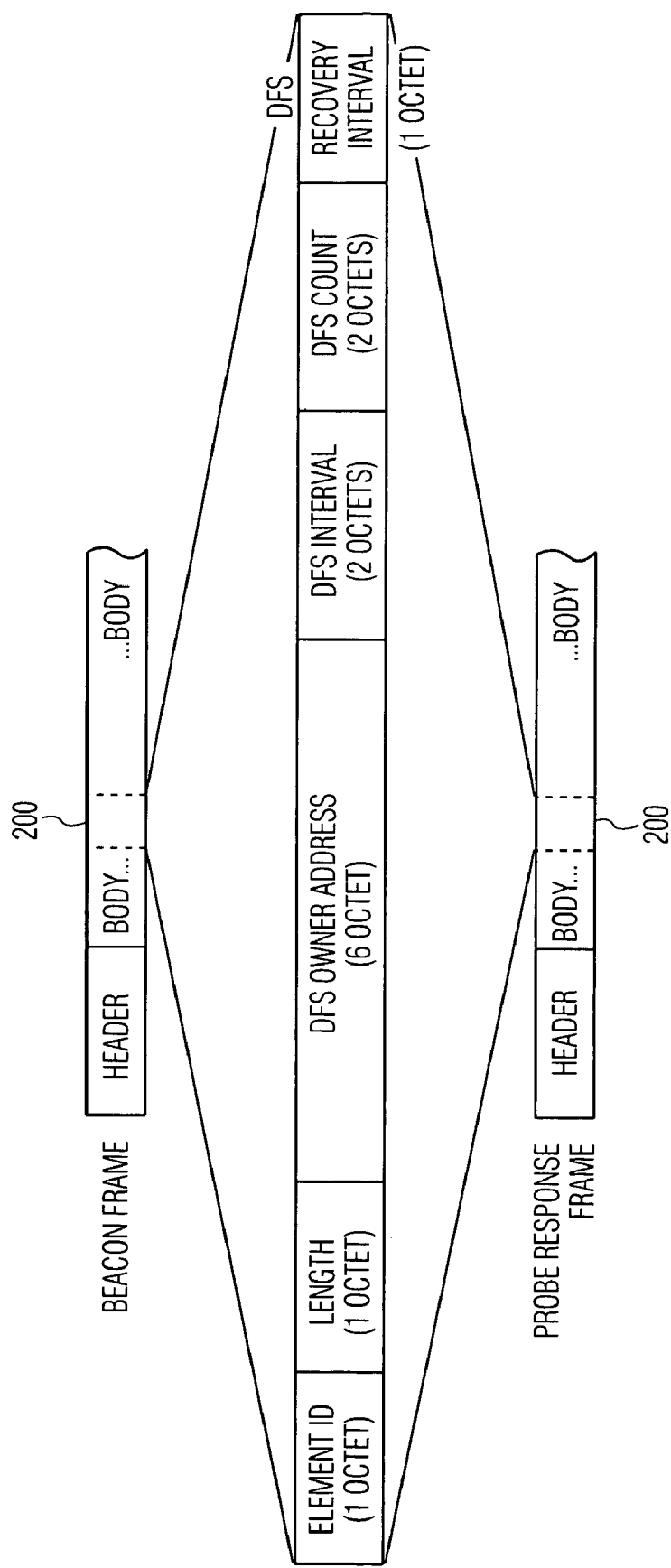
FIG. 2 is a data structure diagram of the DFS element portion of beacon and probe response frames employed in wireless communications with dynamic frequency selection according to one embodiment of the present invention.

FIG. 2 is a data structure diagram of beacon and probe response frames employed in wireless communications with dynamic frequency selection according to one embodiment of the present invention. Beacon and probe response frames transmitted within wireless networks 101–103 include, within the body of the frame, a DFS element 200. The DFS element 200 includes an element identifier (2 octets) and a length parameter (1 octet), owner address (6 octets), DFS interval parameter (2 octets), DFS count parameter (2 octets), and a DFS recovery interval parameter (1 octet). The lengths of the fields are given merely for illustrative purposes, and other field lengths using the same concepts may be suitably employed as well.

The owner address within DFS element 200 indicates the media access control (MAC) address of the current "owner" of dynamic frequency selection within a BSS network. Within an IBSS network, for example, the STA initiating the IBSS network initially places its own MAC address in the owner field. After a channel switch, the first STA transmitting a beacon frame includes its own MAC address in that field. In an infrastructure BSS network, an access point (AP) serves as the DFS owner. The DFS owner is responsible for channel measurements, new channel selection, and new channel announcement.

The DFS interval indicates the maximum duration (in beacon intervals) during which a BSS or IBSS network stays in a particular frequency channel in normal operation. In an IBSS network, the DFS interval value is set by the STA initiating the IBSS network. In an infrastructure BSS network, an AP sets the DFS interval value. The DFS interval value needs to satisfy applicable regulatory requirements, such as those promulgated by the European Radiocommunications Commission (ERC), if any.

The DFS count value (which must be less than or equal to the DFS interval value) indicates the number of beacon intervals remaining before the current DFS owner initiates selection of the next frequency channel. If zero, the DFS count indicates that the DFS owner is performing or has already completed channel measurements.

The DFS recovery interval indicates the time, in whole beacon intervals, after the DFS interval has expired at which STAs switch to another channel in the case that a channel switch announcement was not received during the past DFS interval. The station that initiates the BSS or IBSS network determines the DFS recovery interval value, which must satisfy applicable regulatory requirements.

In the present standard based on IEEE 802.11-1999, the legacy announcement traffic indication message (ATIM) has a null frame body. A new announcement traffic indication message including a channel switch announcement information element (CSAI) is employed instead.

FIGS. 3A through 3D depict a high level flowchart for a process of employing beacon frames with a DFS element within an IBSS network according to one embodiment of the present invention. Those skilled in the art will recognize that a substantially similar process, suitably modified, may be employed for probe response frames and/or infrastructure BSS networks.

Figure 3A:
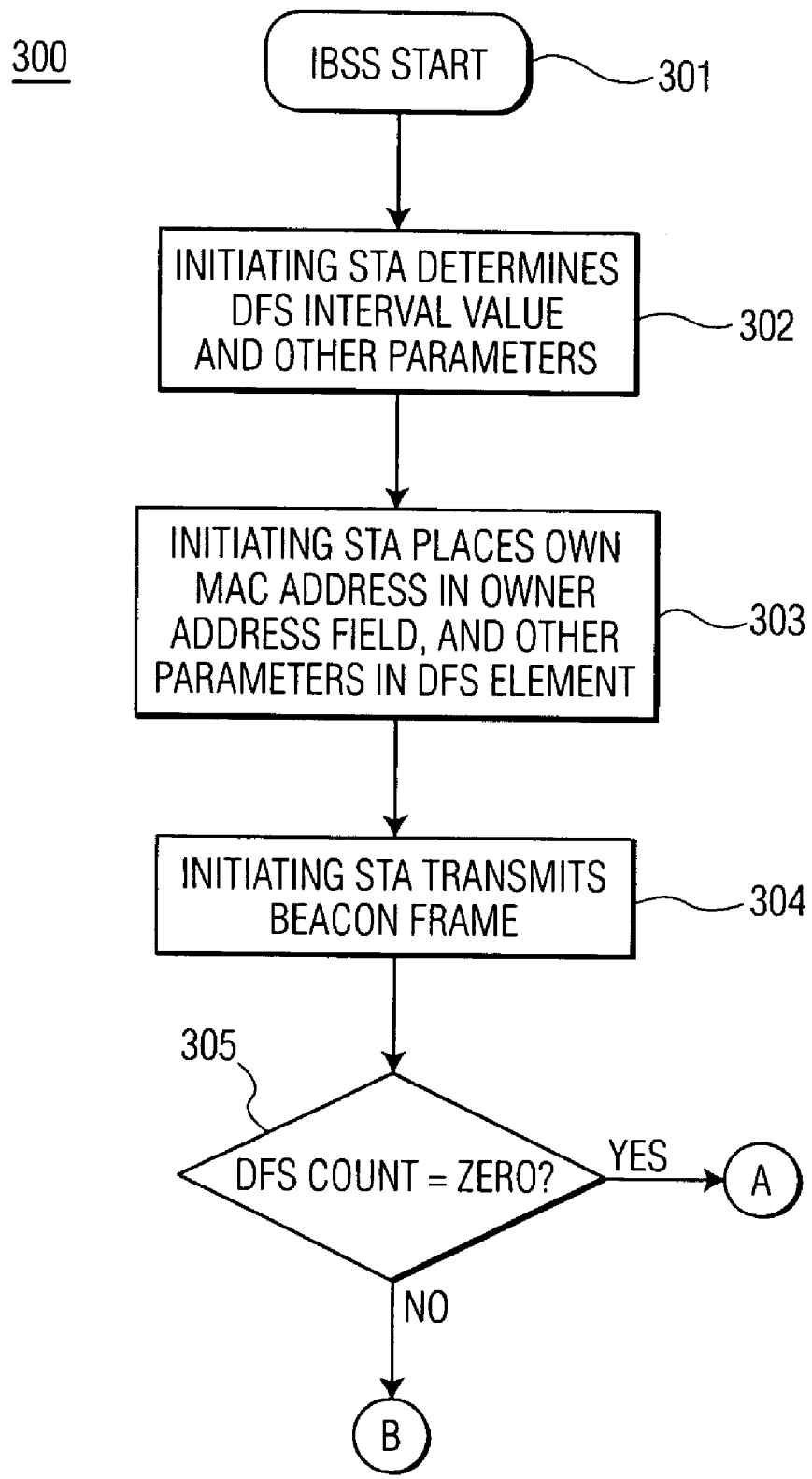
FIGS. 3A–3D depict a high level flowchart for a process of employing beacon frames with a DFS element within an IBSS network according to one embodiment of the present invention.

Referring first to FIG. 3A, the process 300 begins during the IBSS start phase (step 301) with the STA initiating the IBSS network selecting a DFS interval value (step 302), together with values for the beacon interval and announcement traffic information message (ATIM) size, the channel sets to be supported by all stations within the IBSS network, and the BSS basic rate set/operational rate set, as in the case of IEEE 802.11-1999. The initiating station takes the ownership of the first channel selection process and includes its own MAC address within the DFS owner address parameter of the DFS information element of the beacon frame (step 303).

The initiating STA then transmits the beacon frame in a distributed manner based on the beacon transmission rule within the IEEE 802.11-1999 standard. Upon receiving a beacon frame, each receiving STA updates the locally stored DFS owner and DFS count values—that is, replaces the old DFS owner address and DFS count with the new values found in the received beacon frame, effectively replacing the DFS owner if different from that specified within the most recently received prior beacon.

In the normal situation, any STA subsequently transmitting a beacon frame decrements the DFS count value within the transmitted frame by one, if the DFS count value is not already equal to zero. If the DFS count value is zero, the beacon is transmitted with a DFS count of zero. If any STA experiences bad channel conditions, that station is permitted to decrease the DFS count value to any value larger than one, allowing the network to remain within a channel in which one STA experiences bad channel conditions, although other STAs possibly do not experience such bad channel conditions, for a shorter time.

As long as the DFS count value is non-zero (step 305), STAs transmitting beacon frames at beacon intervals continue to decrement the DFS count value within the transmitted frame.

Figure 3B:
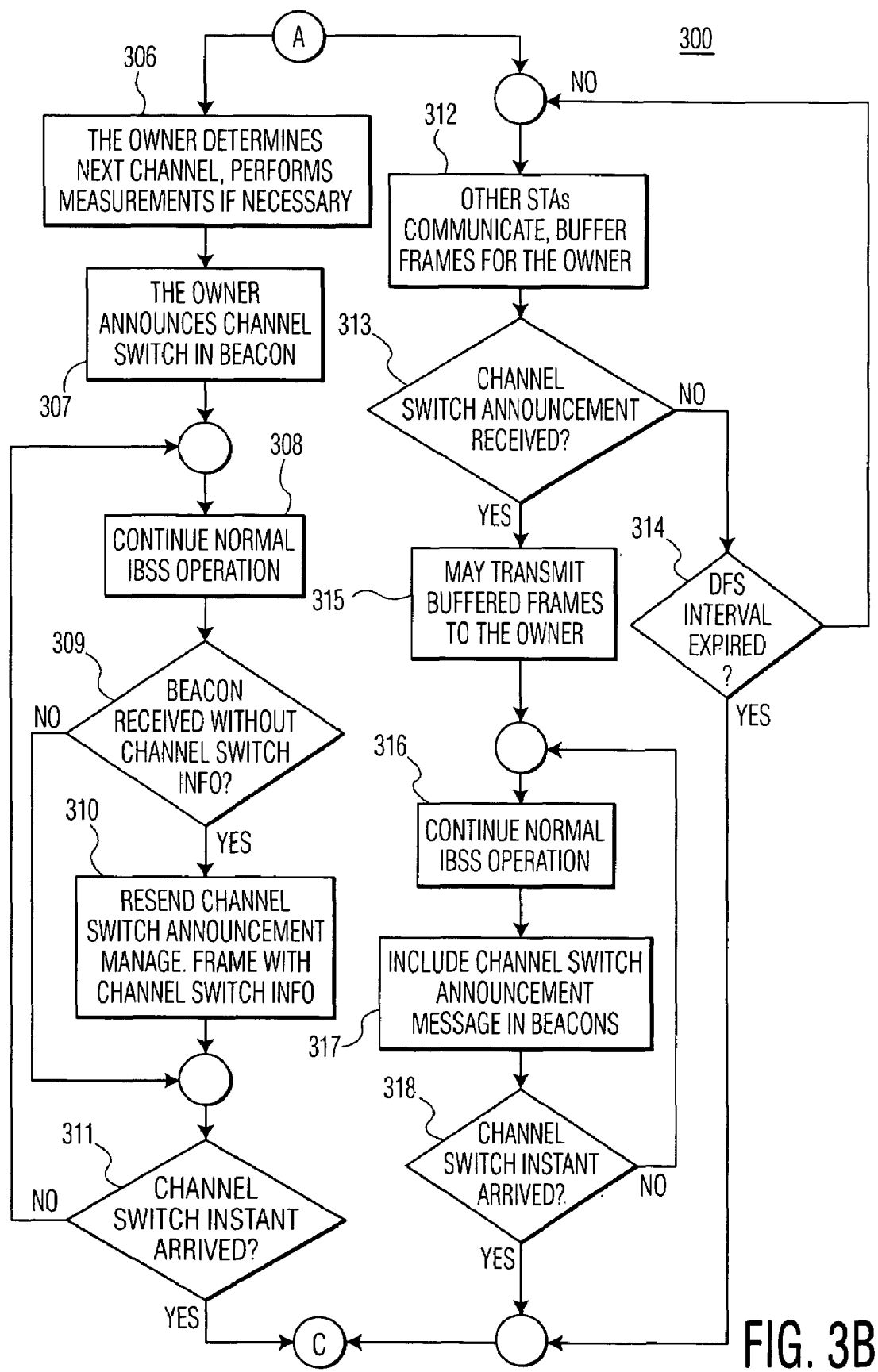

Referring to FIG. 3B, in which steps 306–311 apply only to the DFS owner STA and steps 312–318 apply to all STAs other than the DFS owner, immediately after receiving a beacon with a DFS count value of zero, the DFS owner STA within the IBSS network performs channel measurements (step 307), if necessary, to enable selection of a new channel. The channel(s) selected and measured are limited to the BSS supported channel set. When the DFS owner STA has completed any required measurements and the channel switch decision, the DFS owner STA announces, within the current channel, the next channel to be utilized by the IBSS network through the next beacon frame or the channel switch announcement information element within a channel switch announcement management frame addressed to the broadcast address (step 307), whichever comes first. Normal IBSS operations are then continued (step 308).

While the DFS owner STA is out of the current channel performing channel measurements and selecting the next channel, the remaining STAs communicate normally, except that frames addressed to the DFS owner STA are held and buffered (step 312). The buffered frames may be transmitted to the DFS owner STA when that STA returns to the current channel (step 315), which is known by the receipt of a beacon or channel switch announcement management frame with a channel switch announcement element from the DFS owner STA (step 313). As long as no channel switch announcement is received and the DFS interval has not expired (step 314), all STAs other than the DFS owner continue communicating and buffering frames as necessary (step 312).

All STAs which receive the beacon or channel switch announcement management frame with the channel switch announcement element from the DFS owner STA continue with normal IBSS operation (step 316) but include the channel switch information within their subsequent beacon frames (step 317) before the channel switch time is reached (step 318). After the channel switch, none of the STAs will include such channel switch information within beacon frames until another beacon or channel switch announcement management frame with a channel switch announcement information element is received, unless recovery procedures are initiated as described below.

After announcing the channel switch, the DFS owner STA continues normal IBSS operation (step 308) but checks subsequent beacons from other STAs for the channel switch announcement information element (step 309). If a beacon following the initial beacon or channel switch announcement management frame with the channel switch announcement information element lacks the channel switch announcement information element, the DFS owner STA transmits another channel switch announcement management frame with the channel switch announcement information element (step 310). This may be necessary when a STA which did not receive either the first beacon or channel switch announcement management frame with the channel switch announcement information element or the following beacons with the channel switch announcement information element happens to send a beacon. The DFS owner STA checks all received beacons and retransmits the channel switch announcement management frame with the channel switch announcement information element until the channel switch time (step 316), the target beacon transmission time.

Figure 3C:
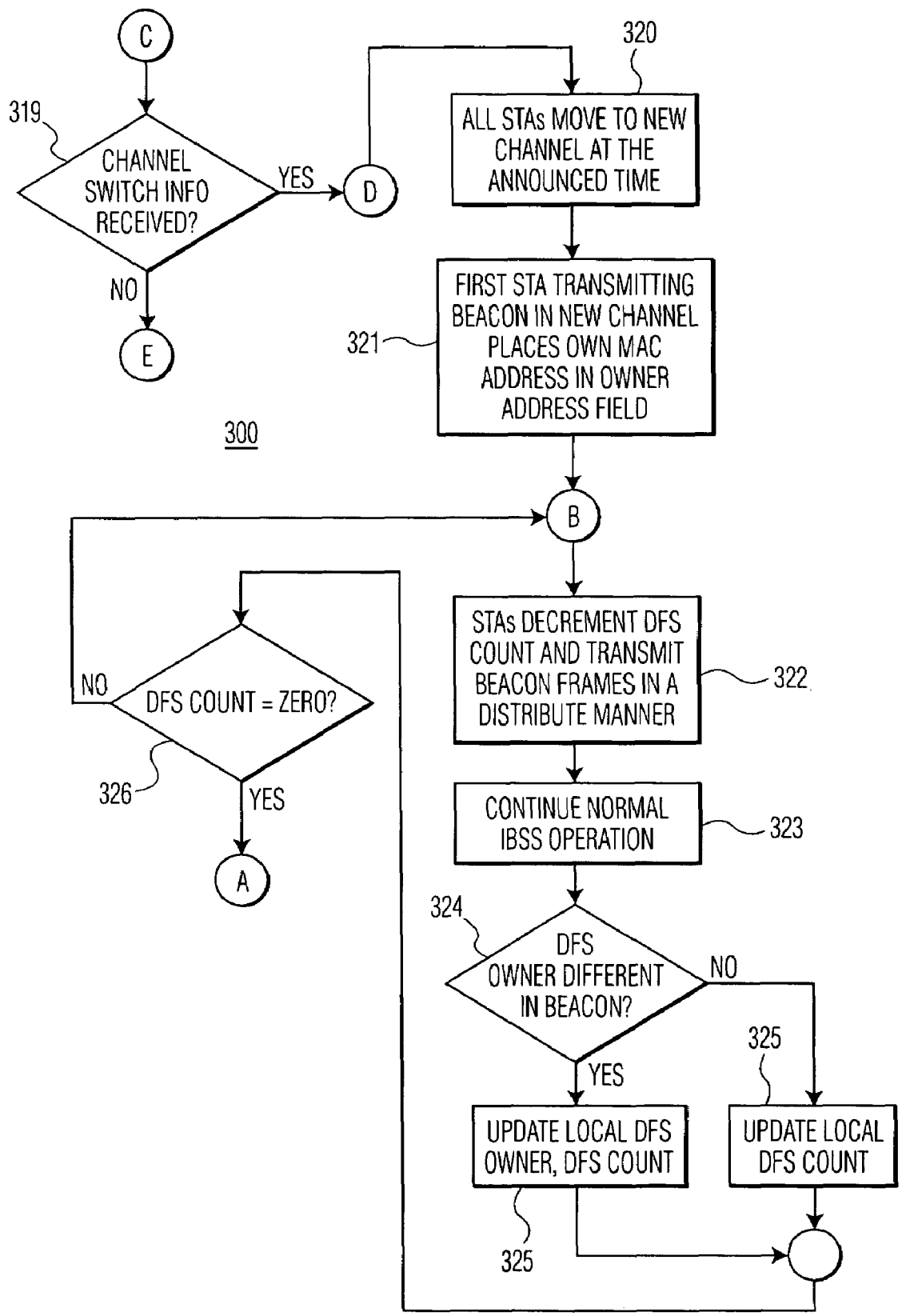

Referring now to FIG. 3C, if the channel switch information has been received (step 319) prior to expiration of the DFS interval (step 311 and 318 in FIG. 3B), all STAs move into the announced frequency channel at or immediately before the channel switch/target beacon transmission time (step 319). The first STA transmitting a beacon in the new channel places its own MAC address in the owner address field (step 320), taking ownership of the dynamic frequency selection process, and sets the DFS count value. While the DFS count value may be set to any value less than the DFS interval, the DFS count should be large enough to allow for several beacon transmissions with a non-zero DFS count value. Similarly, the total duration implied by the DFS count and the maximum measurement duration of the DFS owner station should be less than the DFS interval by a margin sufficient to insure that the channel switch announcement information element is conveyed several times within beacons for the IBSS network prior to the channel switch.

The first beacon transmitted in the new channel may not be received correctly by a particular STA as a result of channel errors or collision. That STA, in transmitting a subsequent beacon, will therefore erroneously believe that the beacon being transmitted is the first beacon within the new channel. To handle such beacon errors, any STA that receives a valid beacon within the new channel containing a DFS owner address which differs from a locally stored DFS owner address updates the locally stored information with the new information from the beacon. With a sufficient number of beacon intervals in the new channel, the chance of having any discrepancy in locally stored DFS owner addresses across the STAs within the IBSS is minimal.

Accordingly, STAs transmitting beacons after the first beacon in the new channel decrement the DFS count (step 321), and IBSS operations continue normally (step 322) except all STAs receiving any beacons within the new channel check the DFS owner address within the beacon against the locally stored information (step 323). If the two DFS owner addresses differ, the locally stored DFS owner address and DFS count value are updated from the received beacon (step 324). If the two DFS owner addresses are identical, the locally stored DFS count value is updated from the received beacon (step 325).

Similarly, any received channel switch information such as new channel frequency, channel switch time, etc. from the most recent beacon or channel switch announcement management frame is employed to update the locally stored channel switch information. When the DFS count value in the new channel reaches zero (step 326), the channel selection and measurement process is repeated, followed by channel switch announcement and movement to the new channel.

Figure 3D:
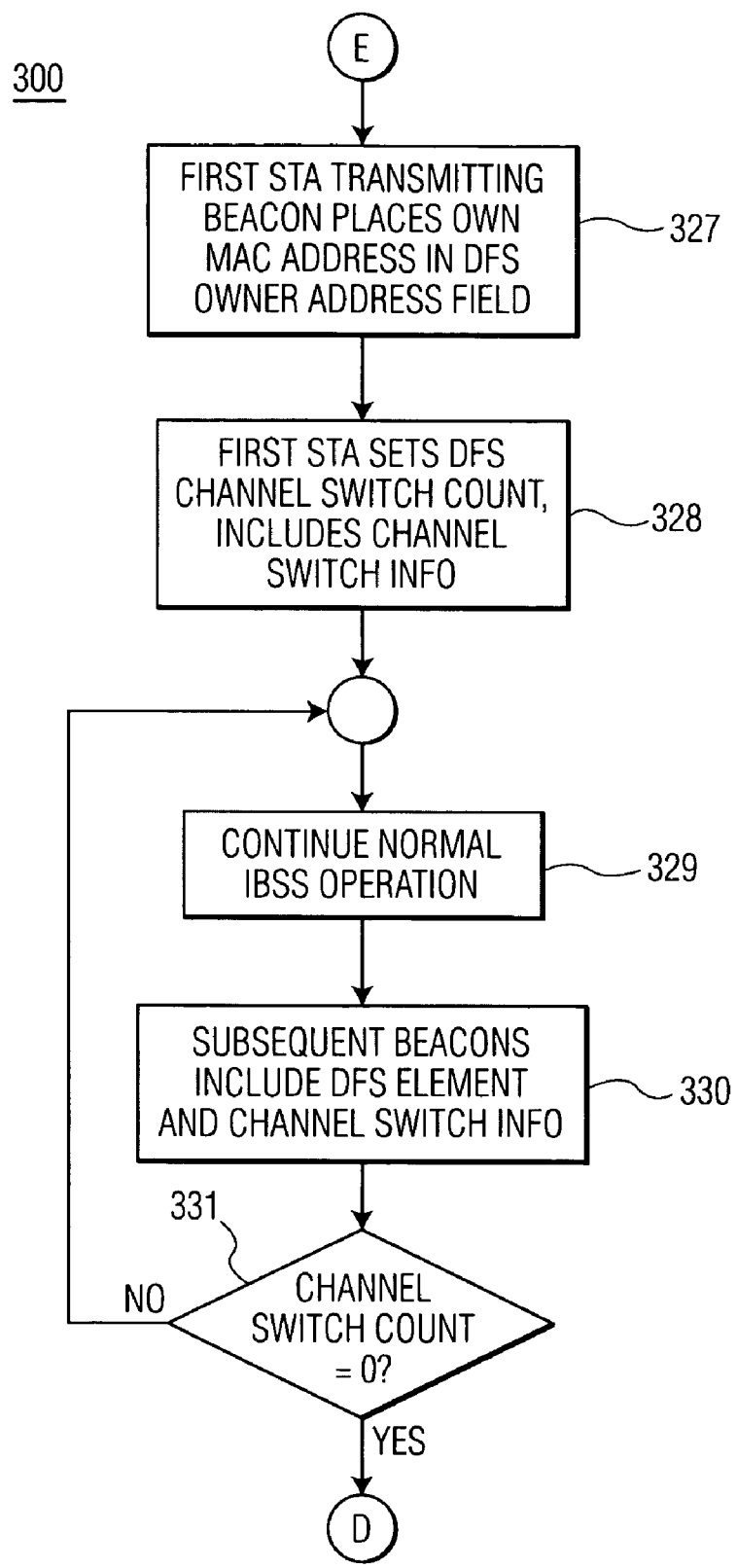

Referring to FIG. 3D, if a STA has not received a channel switch announcement management frame or beacon containing a channel switch announcement information element prior to elapse of the current DFS interval (step 319 in FIG. 3C), that STA performs a DFS recovery procedure. During DFS recovery, the first STA to successfully transmit a beacon includes its own MAC address within the DFS owner field of the DFS element (step 328). The first STA to successfully transmit a beacon also sets the DFS count and channel switch count values, and includes channel switch information within the beacon based on its own information about other channel conditions, which should be available to any STA even if not up-to-date.

The first beacon during the DFS recovery period sets the initial DFS count value within the DFS element and the initial channel switch count value within the channel switch information element as specified by the DFS recovery interval field in the DFS element in order to expedite a channel switch. Normal IBSS operation continues (step 329), except the DFS owner and channel switch information are repeated in subsequent beacons (step 330), and the DFS count and channel switch count are decremented in each beacon as described above. During recovery procedures, a STA receiving a beacon containing a different DFS owner address or different channel switch information than that which is locally stored updates the local values with those from the beacon, and attempts to transmit the next beacon with the updated information. When the channel switch count value equals zero (step 331), all STAs switch to the next channel (step 320 in FIG. 3C).

Figure 4:
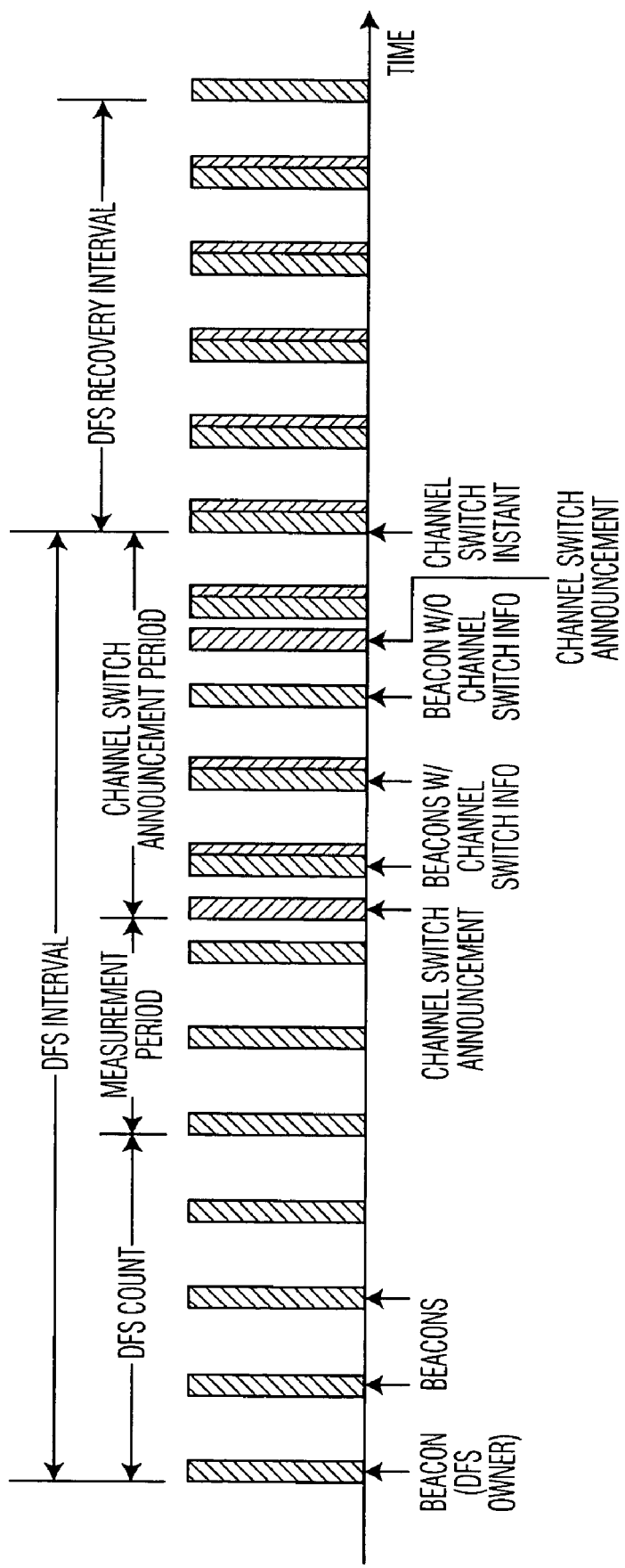
FIG. 4 depicts a timing diagram for dynamic frequency selection within an IBSS network according to one embodiment of the present invention.

FIG. 4 depicts a timing diagram for dynamic frequency selection within an IBSS network according to one embodiment of the present invention. The DFS parameter relationships for one channel period within an IBSS network are illustrated. The channel period, one DFS interval, begins with a beacon transmitted by the DFS owner for the channel period. Ownership of the DFS process, once acquired by a STA, is retained until the end of the DFS interval unless changed based on the rules described above (e.g., a beacon is transmitted with a different DFS owner address than in the first beacon transmitted).

Beacons continue to be transmitted by STAs other than the DFS owner STA throughout the lifetime of the IBSS network. The DFS owner performs any required channel measurements and selects the new channel, then transmits a channel switch announcement management frame with the new channel frequency information in the exemplary embodiment.

Beacons subsequent to the channel switch announcement should contain the channel switch information from the channel switch announcement. Each time a beacon does not contain the channel switch information, the channel switch announcement may be repeated. At the announced channel switch instant, all STAs switch to the new channel.

The DFS recovery interval follows the DFS interval. Beacons transmitted during the DFS recovery interval include the channel switch announcement information.

Figure 5:
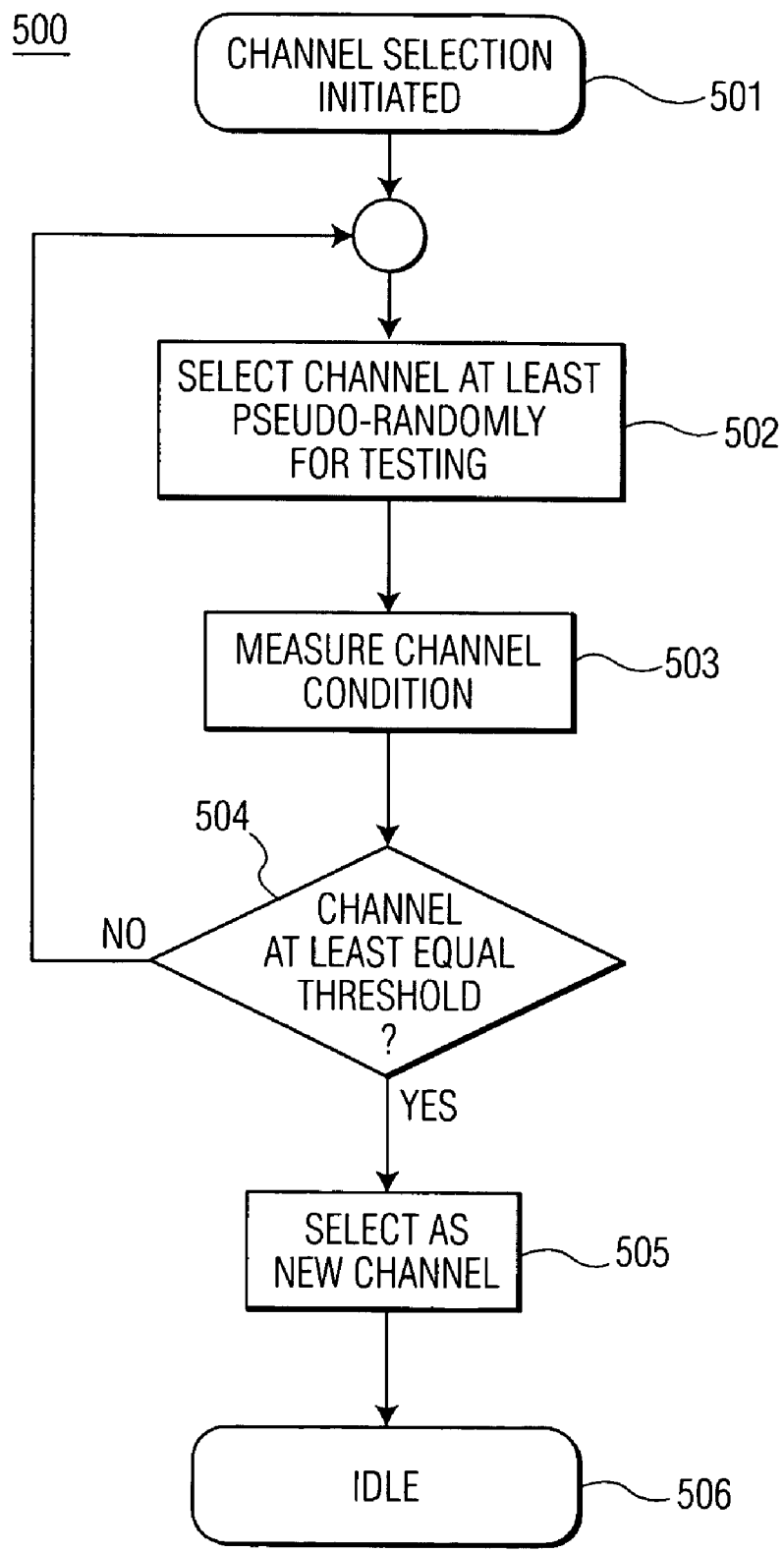
FIG. 5 is a high level flowchart for a process of channel selection for a wireless network employing dynamic frequency selection according to one embodiment of the present invention.

FIG. 5 is a high level flowchart for a process of channel selection for a wireless network employing dynamic frequency selection according to one embodiment of the present invention. The process 500 is performed by the DFS owner in determining the next channel (step 307 in FIG. 3A), and begins with channel selection being triggered (step 501) by the transmission or reception of a beacon containing a DFS count value of zero.

A channel from the supported channel set is randomly, or at least pseudo-randomly, selected for testing (step 502) and the channel conditions for the selected channel are measured (step 503). If the measured channel condition does not exceed, or at least equal, a threshold condition (step 504), another channel from the supported channel set is selected and measured. Otherwise the tested channel is selected as the new channel (step 505) and the channel selection process becomes idle until again triggered by a beacon containing a DFS count value of zero. This channel selection process minimizes channel measurement time.

The present invention allows dynamic frequency selection to be incorporated into IEEE 802.11 wireless networks through a small change to the IEEE 802.11 standard, such that an existing IEEE 802.11 implementation may be easily modified to incorporate the present invention. The present invention achieves dynamic frequency selection in a distributed manner within an IBSS network with channel changes having minimal impact on existing network operations.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A portion of a wireless communications system comprising:
a station wirelessly transmitting a management frame including a dynamic frequency selection element defining a dynamic frequency selection owner, a dynamic frequency selection interval specifying a maximum period that a channel will be employed by stations within the wireless communications system, a dynamic frequency selection count specifying a time remaining until dynamic selection of a next channel is initiated, and a dynamic frequency selection recovery interval specifying a time after an end of the dynamic frequency selection interval when recovery procedures are initiated if no channel switch information is received during the dynamic frequency selection interval, wherein each station within the wireless communications system receiving the management frame transmits subsequent management frames with the dynamic frequency selection element during the dynamic frequency selection interval, and switches to the next channel at an announced channel switch instant.

2. The portion of a wireless communications system according to claim 1, wherein the dynamic frequency selection owner, upon selecting the next channel during the dynamic frequency selection interval, transmits a channel switch announcement identifying the next channel.

3. The portion of a wireless communications system according to claim 2, wherein the dynamic frequency selection owner, upon detecting a beacon without channel switch information following transmission of the channel switch announcement, retransmits the channel switch announcement.

4. The portion of a wireless communications system according to claim 1, wherein a station transmitting a first beacon after moving to a new operational channel becomes the initial dynamic frequency selection owner for a dynamic frequency selection interval.

5. The portion of a wireless communications system according to claim 4, wherein a station transmitting a beacon with the station's address in the dynamic frequency selection element, after the first beacon, becomes the dynamic frequency selection owner for a remainder of the dynamic frequency selection interval.

6. The portion of a wireless communications system according to claim 1, wherein, if no channel switch announcement is received during a dynamic frequency selection interval, a first station transmitting a beacon following an end of the dynamic frequency selection interval assumes dynamic frequency selection ownership, sets the dynamic frequency selection count and a channel switch count equal to the dynamic frequency selection interval value, and includes a channel switch announcement and the dynamic frequency selection element in the beacon.

7. The portion of a wireless communications system according to claim 1, wherein stations other than the dynamic frequency selection owner decrement the dynamic frequency selection count and include the dynamic frequency selection element in any beacon transmitted by such station, and include any received channel switch announcement within any beacon transmitted by such station prior to an end of the dynamic frequency selection interval.

8. A wireless communications system comprising:
a plurality of stations,
at least one station within the plurality of stations wirelessly transmitting a management frame including a dynamic frequency selection element defining a dynamic frequency selection owner, a dynamic frequency selection interval specifying a maximum period that a channel will be employed by stations within the wireless communications system, a dynamic frequency selection count specifying a time remaining until dynamic selection of a next channel is initiated, and a dynamic frequency selection recovery interval specifying a time after an end of the dynamic frequency selection interval when recovery procedures are initiated if no channel switch information is received during the dynamic frequency selection interval, wherein each remaining station within the plurality of stations transmits subsequent management frames with the dynamic frequency selection element during the dynamic frequency selection interval, and switches to the next channel at an announced channel switch instant.

9. The wireless communications system according to claim 8, wherein the dynamic frequency selection owner, upon selecting the next channel during the dynamic frequency selection interval, transmits a channel switch announcement identifying the next channel and the channel switch instant.

10. The wireless communications system according to claim 9, wherein the dynamic frequency selection owner, upon detecting a beacon without channel switch information following transmission of the channel switch announcement, retransmits the channel switch announcement.

11. The wireless communications system according to claim 8, wherein a station transmitting a first beacon after moving to a new operational channel becomes the initial dynamic frequency selection owner for a dynamic frequency selection interval.

12. The wireless communications system according to claim 11, wherein a station transmitting a beacon with the station's address in the dynamic frequency selection element, after the first beacon, becomes the dynamic frequency selection owner for a remainder of the dynamic frequency selection interval.

13. A method of wireless communications comprising:
wirelessly transmitting a management frame from at least one station within a plurality of stations forming a wireless communications system, the management frame including a dynamic frequency selection element defining a dynamic frequency selection owner, a dynamic frequency selection interval specifying a maximum period that a channel will be employed by stations within the wireless communications system, a dynamic frequency selection count specifying a time remaining until dynamic selection of a next channel is initiated, and a dynamic frequency selection recovery interval specifying a time after an end of the dynamic frequency selection interval when recovery procedures are initiated if no channel switch information is received during the dynamic frequency selection interval;
transmitting subsequent management frames with the dynamic frequency selection element by other stations within the plurality of stations during the dynamic frequency selection interval; and
switching the plurality of stations to the next channel at an announced channel switch time.

14. The method according to claim 13, further comprising:
transmitting a channel switch announcement identifying the next channel upon selecting the next channel and the channel switch time during the dynamic frequency selection interval.

15. The method according to claim 14, further comprising:
upon detecting a beacon without channel switch information following transmission of the channel switch announcement, retransmitting the channel switch announcement.

16. The method according to claim 13, wherein a station transmitting a first beacon after moving to a new operational channel becomes the initial dynamic frequency selection owner for a dynamic frequency selection interval.

17. The method according to claim 16, wherein a station transmitting a beacon with the station's address in the dynamic frequency selection element, after the first beacon, becomes the dynamic frequency selection owner for a remainder of the dynamic frequency selection interval.

18. The method according to claim 13, further comprising:
if no channel switch announcement is received during a dynamic frequency selection interval, assuming, at a first station transmitting a beacon following an end of the dynamic frequency selection interval, dynamic frequency selection ownership, setting the dynamic frequency selection count and a channel switch count equal to the dynamic frequency selection interval value, and including a channel switch announcement and the dynamic frequency selection element in the beacon.

19. The method according to claim 13, wherein stations other than the dynamic frequency selection owner decrement the dynamic frequency selection count and include the dynamic frequency selection element in any beacon transmitted by such station, and include any received channel switch announcement within any beacon transmitted by such station prior to an end of the dynamic frequency selection interval.

20. A portion of a wireless communications system comprising:
a station wirelessly transmitting a management frame including a dynamic frequency selection element defining a dynamic frequency selection owner, a dynamic frequency selection interval specifying a maximum period that a channel will be employed by stations within the wireless communications system, and a dynamic frequency selection count specifying a time remaining until dynamic selection of a next channel is initiated, wherein each station within the wireless communications system receiving the management frame transmits subsequent management frames with the dynamic frequency selection element during the dynamic frequency selection interval, and switches to the next channel at an announced channel switch instant.

21. The portion of a wireless communications system according to claim 20, wherein the dynamic frequency selection owner, upon selecting the next channel during the dynamic frequency selection interval, transmits a channel switch announcement identifying the next channel and the channel switch time.

22. The portion of a wireless communications system according to claim 21, wherein the dynamic frequency selection owner, upon detecting a beacon without channel switch information following transmission of the channel switch announcement, retransmits the channel switch announcement.

23. The portion of a wireless communications system according to claim 20, wherein a station transmitting a first beacon after moving to the next channel becomes the initial dynamic frequency selection owner for a dynamic frequency selection interval.

24. The portion of a wireless communications system according to claim 23, wherein a station transmitting a beacon after the first beacon with the station's address in the dynamic frequency selection element becomes the dynamic frequency selection owner for a remainder of the dynamic frequency selection interval.

25. A wireless communications system comprising:
a plurality of stations,
at least one station within the plurality of stations wirelessly transmitting a management frame including a dynamic frequency selection element defining a dynamic frequency selection owner, a dynamic frequency selection interval specifying a maximum period that a channel will be employed by stations within the wireless communications system, and a dynamic frequency selection count specifying a time remaining until dynamic selection of a next channel is initiated, wherein each remaining station within the plurality of stations transmits subsequent management frames with the dynamic frequency selection element during the dynamic frequency selection interval, and switches to the next channel at an announced channel switch time.

26. The wireless communications system according to claim 25, wherein the dynamic frequency selection owner, upon selecting the next channel during the dynamic frequency selection interval, transmits a channel switch announcement identifying the next channel and the channel switch time.

27. The wireless communications system according to claim 25, wherein the dynamic frequency selection owner, upon detecting a beacon without channel switch information following transmission of the channel switch announcement, retransmits the channel switch announcement.

28. The wireless communications system according to claim 25, wherein a station transmitting a first beacon after moving to the next channel becomes the initial dynamic frequency selection owner for a dynamic frequency selection interval during which the next channel is to be employed by stations within the wireless communications system.

29. The wireless communications system according to claim 28, wherein a station transmitting a beacon after the first beacon with the station's address in the dynamic frequency selection element becomes the dynamic frequency selection owner for a remainder of the dynamic frequency selection interval.

30. A method of wireless communications comprising:
wirelessly transmitting a management frame from at least one station within a plurality of stations forming a wireless communications system, the management frame including a dynamic frequency selection element defining a dynamic frequency selection owner, a dynamic frequency selection interval specifying a maximum period that a channel will be employed by stations within the wireless communications system, and a dynamic frequency selection count specifying a time remaining until dynamic selection of a next channel is initiated;
transmitting subsequent management frames with the dynamic frequency selection element by other stations within the plurality of stations during the dynamic frequency selection interval; and
switching the plurality of stations to the next channel at an announced channel switch time.

31. The method according to claim 30, further comprising:
transmitting a channel switch announcement identifying the next channel and the channel switch time upon selecting the next channel during the dynamic frequency selection interval.

32. The method according to claim 31, further comprising:
upon detecting a beacon without channel switch information following transmission of the channel switch announcement, retransmitting the channel switch announcement.

33. The method according to claim 30, wherein a station transmitting a first beacon after moving to the next channel becomes the initial dynamic frequency selection owner for a dynamic frequency selection interval.

34. The method according to claim 33, wherein a station which did not receive the first beacon which transmits a beacon after the first beacon with the station's own address in the dynamic frequency selection element becomes the dynamic frequency selection owner for a remainder of the dynamic frequency selection interval.

* * * * *